(12) United States Patent
Yanaka et al.

(10) Patent No.: US 7,455,570 B2
(45) Date of Patent: Nov. 25, 2008

(54) LARGE PART POLISHING APPARATUS AND POLISHING METHOD

(75) Inventors: Satoru Yanaka, Yokosuka (JP); Satoru Asai, Yokohama (JP); Ryusuke Tsuboi, Yokohama (JP); Kenji Kamimura, Yokohama (JP); Tadashi Tanuma, Yokohama (JP); Masataka Kikuchi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/313,696

(22) Filed: Dec. 22, 2005

(65) Prior Publication Data

US 2006/0111025 A1 May 25, 2006

Related U.S. Application Data

(63) Continuation of application No. PCT/JP2004/006161, filed on Apr. 28, 2004.

(51) Int. Cl.
*B24B 1/00* (2006.01)
(52) U.S. Cl. .......................................... 451/38; 451/75
(58) Field of Classification Search ............... 451/38, 451/75, 80–84, 87, 88, 91–99
See application file for complete search history.

(56) References Cited

U.S. PATENT DOCUMENTS

| | | | | |
|---|---|---|---|---|
| 4,064,656 A | * | 12/1977 | Zeidler | 451/89 |
| 4,319,435 A | * | 3/1982 | Suzuki et al. | 451/3 |
| 5,127,198 A | * | 7/1992 | Nakayama et al. | 451/82 |
| 5,199,228 A | * | 4/1993 | Beausoleil | 451/80 |
| 6,146,247 A | * | 11/2000 | Nokubi et al. | 451/40 |
| 6,568,994 B1 | | 5/2003 | Shaw | |
| 6,926,594 B1 | * | 8/2005 | Nakayama | 451/85 |
| 2003/0027495 A1 | | 2/2003 | Shaw | |

FOREIGN PATENT DOCUMENTS

| | | |
|---|---|---|
| CN | 2252680 Y | 4/1997 |
| JP | 3-26466 | 2/1991 |
| JP | 7-932 | 1/1995 |
| JP | 9-314468 | 12/1997 |
| JP | 10-225866 | 8/1998 |
| JP | 11-347945 | 12/1999 |
| JP | 2000-61846 | 2/2000 |
| JP | 2003-508238 | 3/2003 |
| TW | 142597 | 9/1990 |

* cited by examiner

*Primary Examiner*—Dung Van Nguyen
(74) *Attorney, Agent, or Firm*—Oblon, Spivak, McClelland, Maier & Neustadt, P.C.

(57) ABSTRACT

The present invention comprises a turntable which holds a turbine part at a predetermined position, the turn table being rotatably supported by a support member, and rotated and driven by a driving motor, an abrasive feeding unit which feeds an abrasive particle having an elastic material as a core to a predetermined position as an abrasive, and a polishing head including an impeller which is rotated and driven by an impeller driving motor at high speed and applies rotary energy to the abrasive particle to be supplied from the abrasive feeding unit, the polishing head injecting the abrasive particle flying from the tangential direction of the impeller at a predetermined speed toward a surface to be polished of the turbine part held on the turntable, and an abrasive recovery unit which recovers the abrasive particle provided for polishing of the turbine part from the polishing head, and feeding into the abrasive feeding unit.

2 Claims, 11 Drawing Sheets

Steam flow →

LARGE PART POLISHING APPARATUS AND POLISHING METHOD

CROSS-REFERENCE TO RELATED APPLICATIONS

This is a Continuation Application of PCT Application No. PCT/JP2004/006161, filed Apr. 28, 2004, which was published under PCT Article 21(2) in Japanese.

BACKGROUND OF THE INVENTION

1. Field of the Invention

The present invention relates to a large part polishing apparatus and polishing method for polishing a large structural part such as a steam turbine part by projecting and colliding an abrasive particle having an elastic material as a core to the surface thereof.

2. Description of the Related Art

In steam turbines, in particular, moving vanes, stationary vanes, turbine rotors, and steam passage parts (for example, valve, steam tube, crossover tube, turbine inlet, turbine outlet, and nozzle box inside), their surface roughness has a key factor on the turbine performance, and it is required to improve the surface roughness (make smoother) of a steam passage as far as possible.

The turbine parts are manufactured in multiple processes, and in particular the manufacturing process for a stationary vane includes many processes such as a stationary vane cutting process, an assembling process, a welding process, a heat treatment process, a polishing process, a finish machining process, a final finishing process, and an inspection process. Therefore, the surface roughness is lowered and flaws are formed due to handling between processes, preparation works, and ambient environments. Besides since the shape is consists of many curved surfaces, it is hard to polish the entire surface perfectly.

A schematic configuration of a general steam turbine will be described by referring to FIGS. 11 to 14.

FIG. 11 is a bird's-eye view schematically showing an entire turbine rotor. As shown in the drawing, a turbine rotor 101 incorporates several stages to tens of stages of moving vanes 102 different in outside diameter in the axial direction, and each stage has tens to about a hundred moving vanes 102 planted in the peripheral direction of a rotor shaft 104, being supported by bearings 104a at both ends. The turbine rotor 101 is covered with a casing 103 forming a steam passage by these moving vanes and stationary vanes described below.

FIG. 12 is a detailed view showing a sectional view of one turbine unit in FIG. 11, in which a nozzle diaphragm 110 is disposed in the casing 103, and steam flows in the arrow direction of the figure in the steam passage formed by the moving vanes 102 planted in the turbine rotor 101.

FIG. 13A is a plan view of the nozzle diaphragm 110, and FIG. 13B is an outside view of the unit in the peripheral direction in FIG. 13A.

The stationary vane 105 has a curved portion 109 which forms a vane shape determined by the flow-in characteristic of steam flow as shown in FIG. 13B. The stationary vane 105 is enclosed by a diaphragm inner ring 106 and a diaphragm outer ring 107, and mechanically coupled by welding or the like. Reference numeral 108 is a seal fin fitting groove, and it is provided for installing a seal fin (not shown) for preventing steam from leaking out between the rotating turbine rotor 101 and the diaphragm inner ring 106 into the casing 103.

The surface roughness of the curved portion 109 of the stationary vane 105, diaphragm inner ring 106, and the stationary vane 105 side of the diaphragm outer ring 107 is known to be a key factor for influencing the turbine performance, in particular, as a result of experiment and running test of actual machines.

The number of stationary vanes 105 is determined by the turbine output characteristic (that is, steam flow rate) as clear from FIG. 13A, and the shape is very narrow and complicated because the vanes are provided in the nozzle diaphragm outer ring and inner ring at specific intervals.

On the other hand, the moving vanes 102 are not specifically shown in the sectional view, but have a distorted three-dimensional shape same as the stationary vanes. Since the vane shape is difference in each turbine stage, they are assembled after being polished through a manual polishing process by means of a power tool or air tool by using Bader machine, sand paper or the like. Depending on the turbine stage, since one moving vane may be longer than 1 meter, unexpected flaw, oxide scale or other defect may occur in the course of working, preparation, handling and transportation in and between processes.

Accordingly, to enhance the performance of the steam turbine, it is required to minimize surface roughness of turbine parts by polishing. However, since the turbine parts are very large in size, and extremely complicated in shape because of steam flow-in characteristic, and such narrow parts must be polished, it is hard to polish automatically or mechanically, and usually it has been attempted to improve the surface state of turbine parts by taking much time and labor by using compressed air and power rotary tools.

To assure the final surface roughness necessary to enhance the performance of turbine parts, finishing in a large shape as a nozzle diaphragm is needed, so that polishing work of very heavy duty, poor environment and long time is demanded.

On the other hand, in manual polishing tools, fine flaws may be formed when polishing narrow parts, in particular, it is hard to obtain a uniform polished surface, and the steam flow-in direction and orthogonal direction may not be polished uniformly, so that the polished surface tends to be uneven.

In air blasting or honing machine, the surface state becomes too rough, and therefore it is hard to achieve the surface roughness for achieving the turbine performance as stated above, and it is not suited as a final finishing tool.

Further, at the time of field checking or repair of an existing steam turbine, in order to obtain information accurately from nondestructive inspection, the surface is cleaned and oxide films are removed by air blasting using a ceramic projection material, but there is a room for further improvement from the viewpoint of enhancement of surface roughness.

Recently, an apparatus for polishing the surface of a member to be polished is proposed, in which an impeller is rotated to provide abrasive grains with centrifugal force, and the abrasive grains are sprayed to the member to be polished in a tangential direction around the impeller, thereby polishing or grinding the surface (Jpn. Pat. Appln. KOKAI Publication No. 11-347945, for example).

BRIEF SUMMARY OF THE INVENTION

This polishing apparatus is suited to polishing of small members such as dental prosthesis. However, the apparatus cannot be applied for polishing the surface of large parts such as turbine parts, the parts being also very complicated and narrow parts due to characteristics of the flowing steam.

It is hence an object of the invention to provide a large part polishing apparatus and polishing method capable of polishing uniformly the surface including a narrow part or fitting part which is conventionally hard to polish, automating the polishing work for a long time in poor environments, removing surface oxide films without impairing the surface roughness, and enhancing the quality of nondestructive inspection and efficiency of polishing work.

The invention provides a large part polishing apparatus for projecting an abrasive particle having an elastic material as a core at a predetermined speed as an abrasive, and polishing by colliding the abrasive particle against a surface to be polished of a large part, the apparatus comprising: a turntable rotatably supported while holding the large part at a predetermined position and driven by a driving motor; an abrasive feeding unit which feeds the abrasive particle to a predetermined position; a polishing apparatus main body comprising a polishing head including at least an impeller which is driven by an impeller driving motor and applies rotary energy to the abrasive particle to be supplied from the abrasive feeding unit, the polishing head injecting the abrasive particle from the tangential direction of the impeller toward a surface to be polished of the large part held on the turntable; and an abrasive recovery unit which recovers the abrasive particle injected to the surface to be polished of the large part by the polishing apparatus main body, and feeding again into the abrasive feeding unit.

Also to achieve the object, the invention provides a large part polishing method comprising the following steps. That is, there is provided a large part polishing method for projecting abrasive particles having elastic materials as cores at a predetermined speed as abrasives, and polishing by colliding the abrasive particles against a surface to be polished of a large part, the method comprising: a step of mounting the large part as the object to be polished on a predetermined position; a step of rotating the mounted large part; an abrasive particle storing step of storing the abrasive particles temporarily; a step of applying a mechanical energy to the abrasive particles supplied in the abrasive particle storing step in order to collide against the large part from a remote position; a step of flying the abrasive particles provided with the energy linearly without interruption; a step of controlling the flight direction such that the projected abrasive particles hit against a desired position of the large part; an abrasive particle recovery step of collecting again the abrasive particles after polishing, the grains falling in the mounting step; and an abrasive particle conveying step of sending the abrasive particles collected in the abrasive particle recovery step again into the abrasive particle storing step.

The invention is capable of polishing the surface of a large parts, such as a turbine nozzle, moving vane, large rotary part such as a turbine rotor, including a narrow part or fitting part which is hard to polish, automating the polishing work for a long time in poor environments, removing oxide films without lowering the surface roughness, and enhancing the quality of nondestructive inspection and efficiency of polishing work.

DETAILED DESCRIPTION OF THE INVENTION

Figure 1:
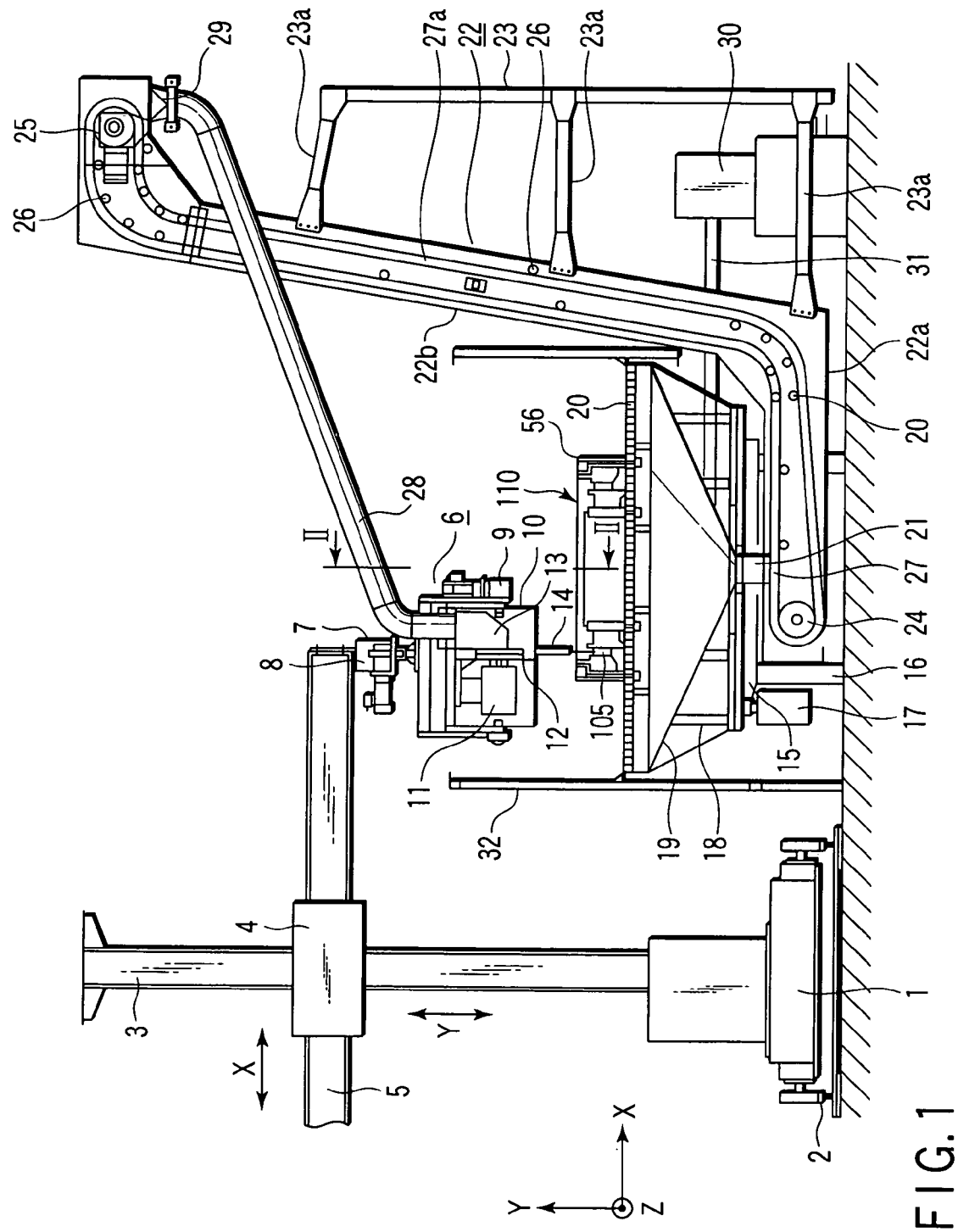
FIG. 1 is a front view showing a first embodiment of a large part polishing apparatus according to the invention.
Figure 2:
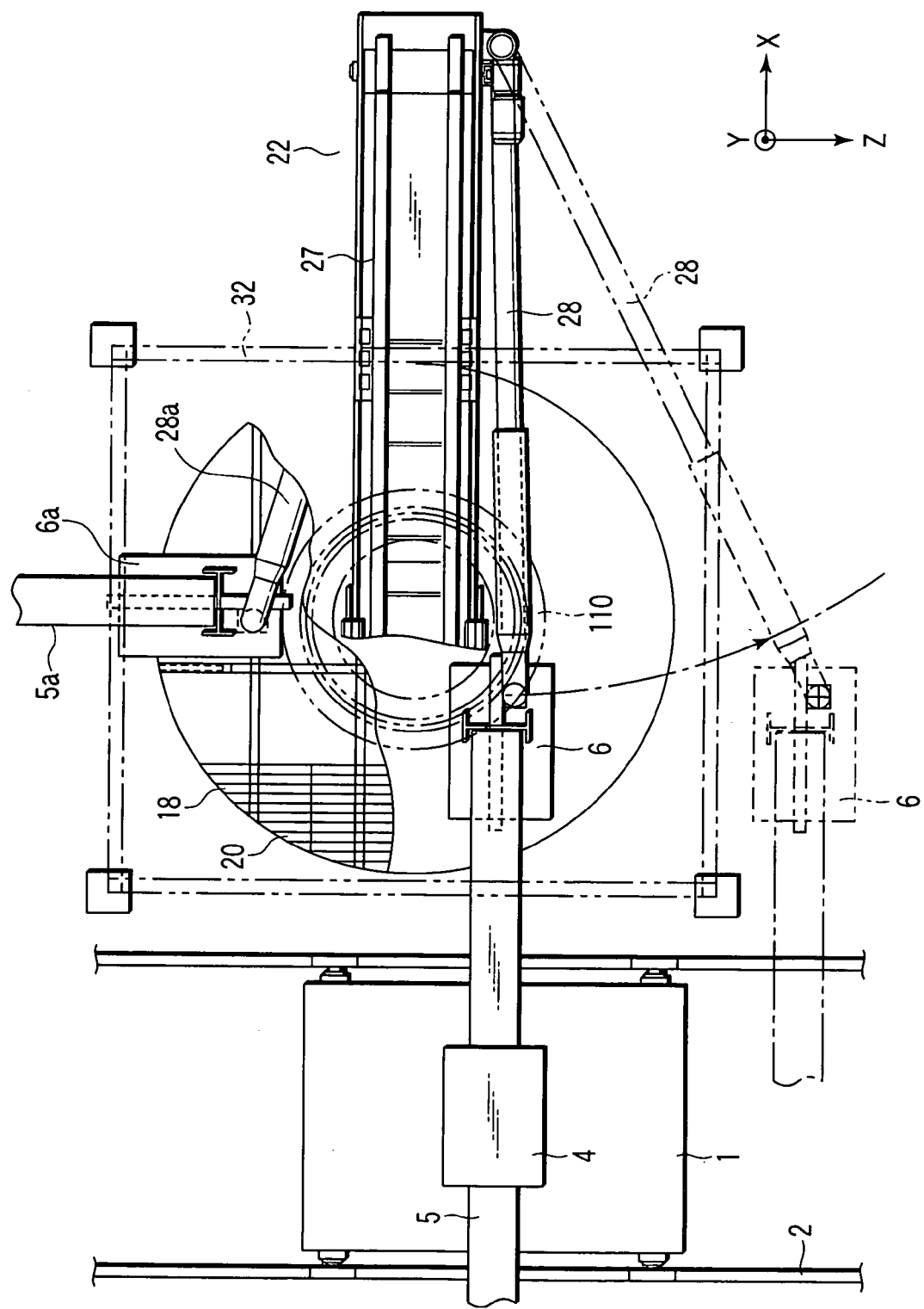
FIG. 2 is a plan view of the embodiment.

FIG. 1 is a front view showing a first embodiment of a large part polishing apparatus according to the invention, and FIG. 2 is a plan view of the embodiment.

In FIGS. 1 and 2, reference numeral 1 is a carriage capable of moving in a direction of Z-axis (perpendicular direction in the drawing) along rails 2, and a stand 3 is mounted perpendicularly on the carriage 1. On the stand 3, a manipulator support portion 4 is mounted movably in a direction of Y-axis (vertical direction in the drawing), and a manipulator 5 is supported on the manipulator support portion 4 so as to be movable in a direction of X-axis (lateral direction in the drawing). The carriage 1, manipulator support portion 4, and manipulator 5 are driven in individual directions by driving sources which are not shown in the drawing.

Figure 3A:
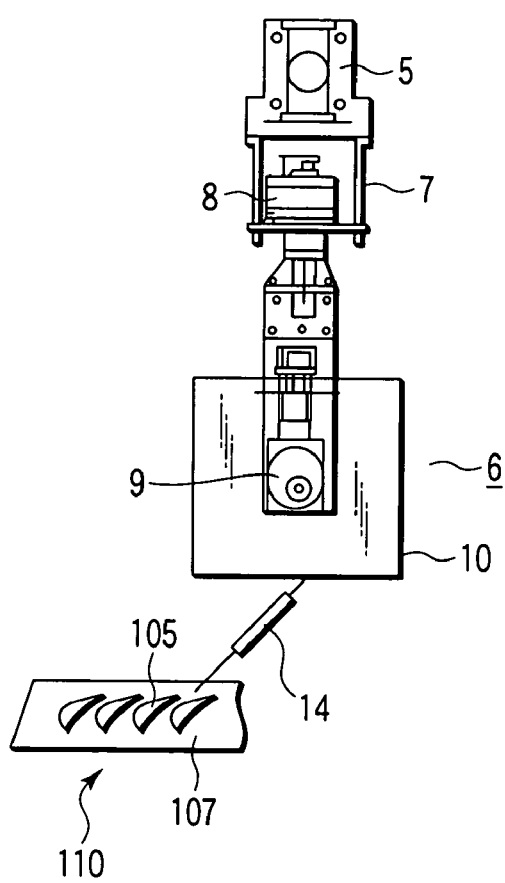
FIG. 3A is a side view of an injection head of the embodiment as seen from the arrow direction alone line II-II in FIG. 1.
Figure 3B:
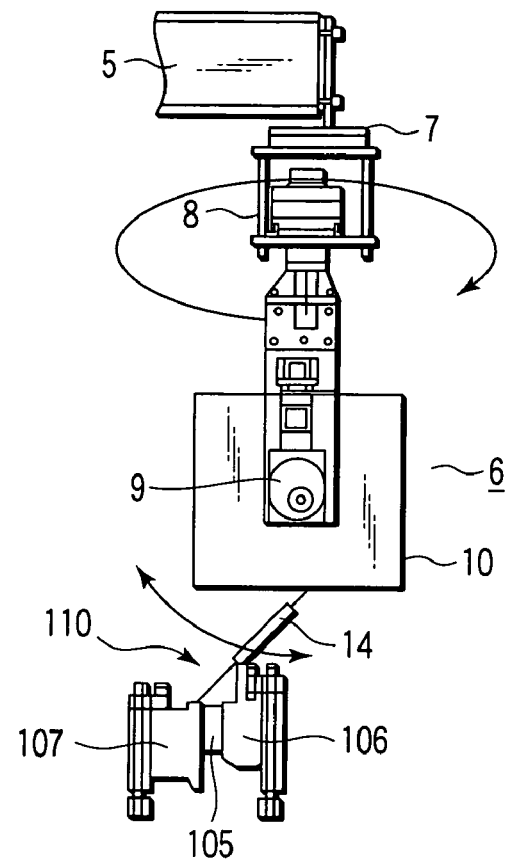
FIG. 3B is a view of the same injection head rotated by 90 degrees.

Reference numeral 6 is a polishing head attached to the leading end of the manipulator 5 by way of a bracket 7, and this polishing head 6 is supported to be free to swirl in a horizontal direction (rotation about the Y-axis) by means of a horizontal swirl drive motor 8 mounted on the bracket 7 as shown in FIGS. 3A and 3B, and is also supported to be free to swivel by an elevation drive motor 9, and these members are combined to configure a polishing apparatus main body.

The polishing head 6 comprises a case 10, an impeller drive motor 11 supported on the top of the case 10 by way of a support member, an impeller 12 to be driven to swirl at high speed by this impeller drive motor 11, a recovery hopper 13 disposed near the impeller 12, and a trough-shaped injection nozzle 14 supported downward from the bottom of the case 10.

On the other hand, reference numeral 15 is a turntable which is rotatably mounted in a horizontal state on a support plate mounted on a plurality of legs 16 on a base plane corresponding to the working area of the polishing head 6, and which is driven by a drive motor 17. A table 18 with recovery tank is mounted on the top of the turntable 15.

This table 18 with recovery tank can mount a large part in an opening on the top of a hopper 19, and a louver-shaped part mounting plate 20 is provided for passing the abrasive particles to the hopper 19 side, and an outlet 21 is provided in the bottom of the hopper 19 for discharging the abrasive particles.

Reference numeral 22 is a duct composed of a horizontal duct portion 22a disposed in a space existing beneath the turntable 15, and an inclined duct portion 22b raised at a specified angle from the horizontal duct portion 22a to a predetermined height. This duct 22 is supported by a support member 23 by way of a support arm 23a at plural positions of the inclined duct portion 22b.

The duct 22 incorporates an endless conveyor 27 circulating and moving through a plurality of guide rollers 26 between a guide ring 24 provided at the side of the horizontal duct portion 22a, and a drive ring 25 provided on the top of the inclined duct portion 22b. The surface of the endless conveyor 27 has a plurality of racks 27a composed of elastic members provided at proper intervals for receiving abrasive particles falling through the outlet 21 of the hopper 19 and preventing abrasive particles from sliding down when moving upward in the inclined duct portion 22b.

Reference numeral 28 is a flexible tube having one end connected to a leading-out portion 29 provided at the lower side of the horizontal part existing on the top of the inclined duct portion 22b, and the other end connected to the top of the case 10 corresponding to the recovery hopper 13 of the polishing head 6. This flexible tube 28 is designed to send the abrasive particles falling through the leading-out portion 29 existing on the inclined duct portion 22b from the endless conveyor 27 into the recovery hopper 13 of the polishing head 6, and it is free to be expanded, contracted, bent or deformed while following up the move in the X-axis direction or Y-axis direction of the manipulator 5, or the horizontal swirl and swivel of the polishing head 6.

On the other hand, reference numeral 30 is a dust collector connected to the hopper 19 of the table 18 with recovery tank by way of a suction pipe 31, and the dust collector 30 is intended to remove dust and deposits mixing in when polishing the turbine parts.

Reference numeral 32 is a dust cover made of canvas or vinyl sheet provided so as to surround the table 18 with recovery tank and the moving space of the polishing head 6 above the table 18.

In the large part polishing apparatus thus configured, suppose a nozzle diaphragm 110 as one of the turbine parts is fixed on the louver-shaped part mounting plate 20 of the table 18 with recovery tank as a large part in a horizontal state maintained by a fixing piece 33.

Herein, the recovery hopper 13 of the polishing head 6 is supposed to contain preliminarily abrasive particles having an elastic material as a core, as an abrasive.

To polish a stationary vane 105 in this state, first, the carriage 1 is moved from the position (retreat position) indicated by double dot chain line shown in FIG. 2 in the direction of Z-axis closely to the side of the table 18 with recovery tank along the rails 2. In succession, the manipulator 5 is moved in the direction of X-axis and in the direction of Y-axis, so that the polishing head 6 may come to above the nozzle diaphragm 110.

By the impeller driving motor 11, the impeller 12 is rotated at high speed.

As result, the abrasive particles in the recovery hopper 13 of the polishing head 6 are injected in a multiplicity at high speed of 1000 m or more per minute through the injection nozzle 14 by high speed rotation of the impeller 12. The entire polishing head 6 swirls by the horizontal swirl drive motor 8, and the injection nozzle 14 swivels and swirls by means of the elevation drive motor 9 to be directed to the surface to be polished of the stationary vane 105 of the nozzle diaphragm 110, whereby abrasives collide against the surface of the stationary vane 105, and the surface of the stationary vane 105 is polished.

At this time, by the swirl operation of the turntable 15 by the drive motor 17, the table 18 with recovery tank swirls while maintaining a horizontal state.

On the other hand, abrasive particles having polished the surface of the stationary vane 105 fall into the hopper 19 through the louver-shaped parts mounting plate 20 of the table 18 with recovery tank, and collected on the endless conveyor 27 through the outlet 21 of the hopper 19. At this time, if metal dust and other foreign matter than abrasive particles produced by polishing of turbine parts mix into the hopper 19, they are attracted and removed by the dust collector 30.

The endless conveyor 27 circulates and moves to and front the guide ring 24 by the drive ring 25 rotated by the drive motor. Therefore, the abrasive particles collected on the endless conveyor 27 are conveyed by way of the horizontal duct portion 22a and inclined duct portion 22b of the duct 22, and fall into the flexible tube 28 from the leading-out portion 29 existing on the inclined duct portion 22b.

In this case, the abrasive particles collected on the endless conveyor 27 can be conveyed onto the inclined duct portion 22b without sliding down from the receiving rack 27a if climbing up in the inclined duct portion 22b.

The abrasive particles having fallen into the flexible tube 28 slide down from the upstream side to the downstream side, and are collected into the recovery hopper 13 of the polishing head 6, and the same action is repeated cyclically.

In the embodiment, as described herein, the manipulator 5 is moved in the direction of X-axis and direction of Y-axis, and the polishing head 6 is moved to be positioned on the nozzle diaphragm 110, and by the biaxial action of swirl and swivel of the entire polishing head 6, the injection port of the injection nozzle 14 can be directly to the surface of the turbine part such as the nozzle diaphragm 110 to inject. Therefore, including the narrow parts and fitting parts which are difficult to polish, the surface can be polished efficiently and securely.

Besides, the table 18 with recovery tank is disposed on the turntable 15 rotating in a horizontal state, and the turbine part is mounted thereon. Accordingly, by rotation of the turntable 15, without changing the position of the polishing head 6 (that is, the nozzle 14), the same position on the whole circumference of the nozzle diaphragm 110 comes sequentially to the injection position of abrasive particles.

Therefore, the whole circumference of the nozzle diaphragm 110 can be polished uniformly. Further, by accurately controlling the rotation amount of the table 15, for example, even in the case of the stationary vane 105 having a plurality of nozzle diaphragms 110 disposed at equal intervals, the same position of all the stationary vanes 105 can be automatically polished uniformly. In this case, in particular, three-dimensional large and heavy objects can be polished automatically.

After polishing of parts, the abrasive particles are collected in the hopper 19 of the table 18 with recovery tank, and conveyed by the endless conveyor 27 to the predetermined height, and from this position, they are collected in the polishing head 6 through the flexible tube 28. As a result, the abrasive particles can be effectively used, and it is not only advantageous economically, but the time for recovery and re-feeding of abrasives can be saved. Besides, fresh abrasive particles can be freely charged through the louver-shaped parts mounting plate 20 on the turntable 15.

The dust cover 32 is intended to prevent the fine metal dust produced by polishing and abrasive applied to the abrasive particles from scattering about, but it is not required necessarily in the polishing work of the embodiment. The material of the dust cover 32 is not limited to the canvas, but vinyl sheet, or metal or resin screen may be used.

In the first embodiment, the polishing head 6 is attached to the leading end of one manipulator 5 so as to realize biaxial motion of swirl and swivel, and the turbine part on the table 18 with recovery tank is polished. However, as shown in FIG. 2, a manipulator 5a and a polishing head 6a of the same configuration may be disposed on the table 18 with recovery tank at positions different by 90 degrees, and the part may be polished simultaneously by two sets of manipulators 5, 5a and polishing heads 6, 6a.

In this way, the same position can be polished simultaneously at two points, or different positions can be polished. Anyway, the working time is shortened, and large turbine parts can be polished more efficiently.

In this embodiment, the polishing head 6 is attached to the leading end of the manipulator 5, but instead of this manipulator, the polishing head may be attached to the leading end of the hand serving as a moving unit, and the same polishing operation may be realized.

In this embodiment, the table 18 with recovery tank is disposed on the turntable 15 rotates in horizontal state. However, the turntable 15 may not be limited to horizontal type, but the turntable may be slightly inclined, and the table with recovery tank may be disposed thereon, so that the abrasive particles injected from the polishing head can be recovered.

In the large part polishing apparatus, in order to realize NC program control or automatic control such as remote control using a computer, the motors of the polishing head 6 and the drive motor of the turntable 15 may be composed of pulse motors or the like capable of controlling the rotating position precisely.

Figure 4:
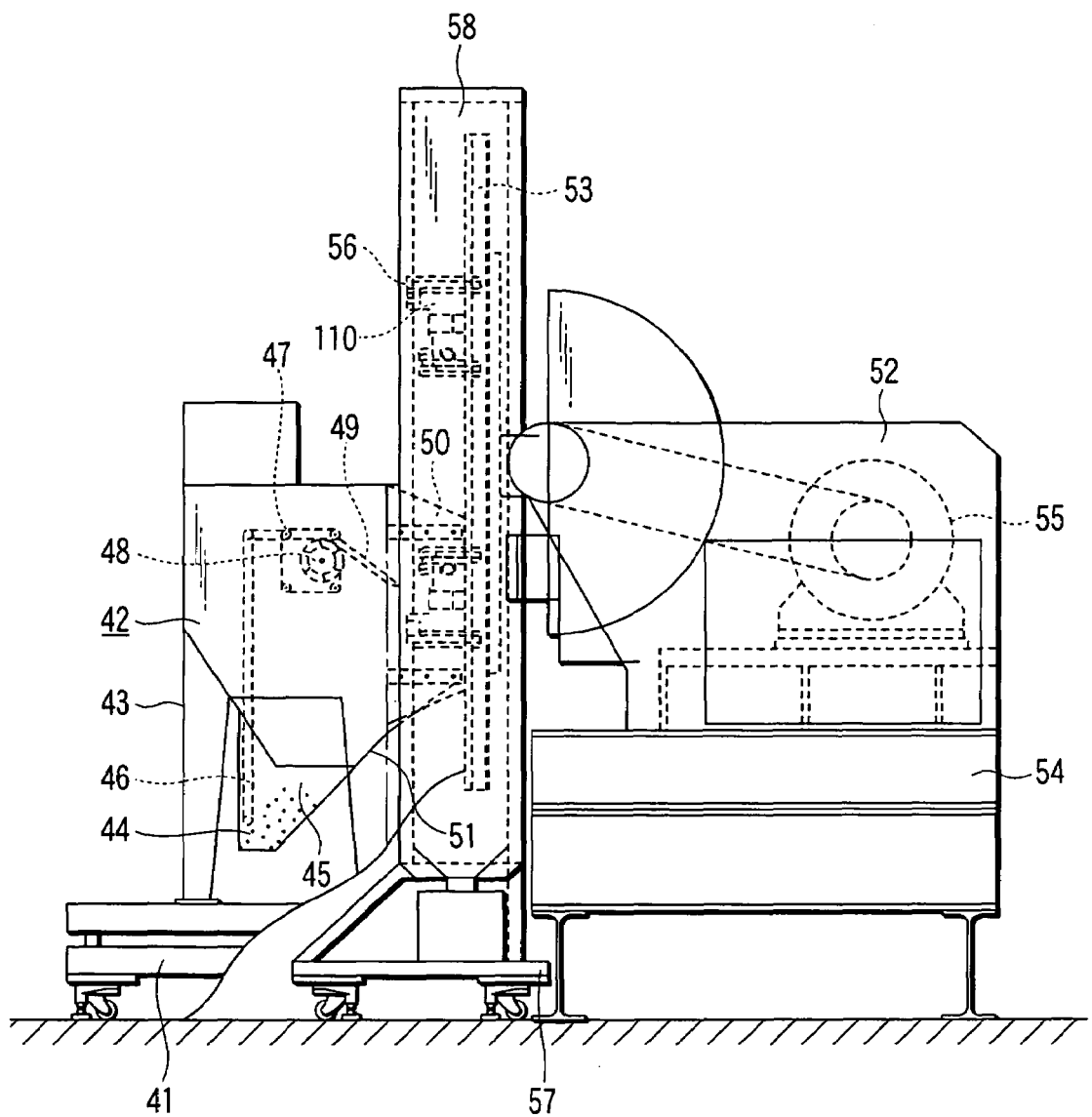
FIG. 4 is a front view showing a second embodiment of a large part polishing apparatus according to the invention.
Figure 5:
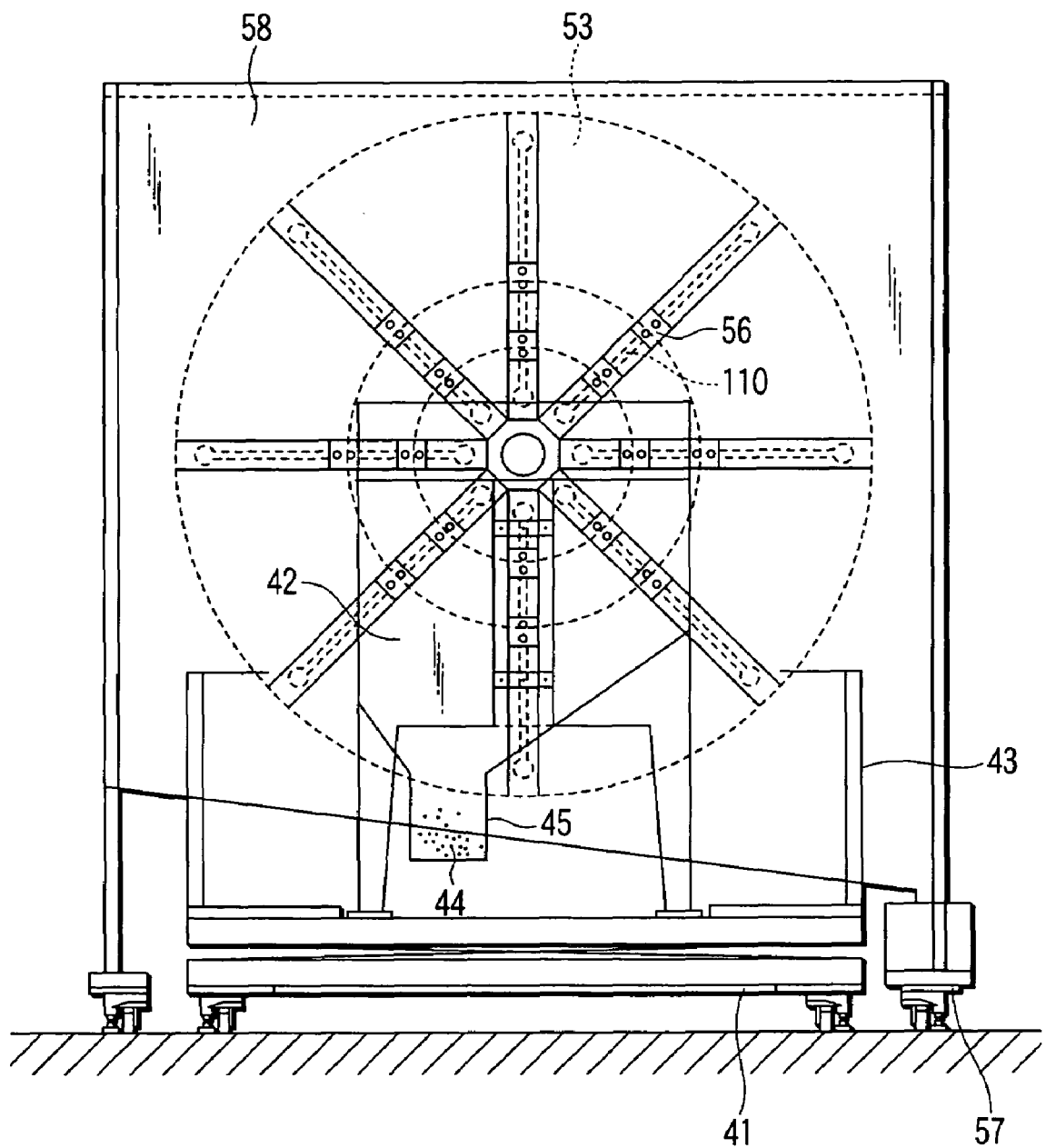
FIG. 5 is a front view of the embodiment.

FIG. 4 is a side view showing a second embodiment of a large part polishing apparatus according to the invention, and FIG. 5 is a front view of the apparatus.

In FIGS. 4 and 5, reference numeral 41 is a carrier with lifter equipped with casters in the lower part, and a polishing apparatus main body 42 is mounted on the carriage 41 with lifter.

This polishing apparatus main body 42 comprises a recovery tank 45 for collecting abrasive particles 44 having an elastic material as a core, as an abrasive, in a case 43, a perpendicular conveying belt mechanism 46 for conveying the abrasive particles 44 in the recovery tank 45 to a proper height above the tank 45, an impeller 48 for giving rotary energy to the abrasive particles 44 supplied by way of a guide belt mechanism 47 after being conveyed above from the recovery tank 45 by way of this perpendicular conveying belt mechanism 46, and a trough-shaped injection nozzle 49 for injecting the abrasive particles 44 at high speed by determining the polishing direction of the object of polishing from the tangential direction of the impeller 48.

In this case, an opening is formed in the plate surface corresponding to the injection nozzle 49 side of the case 43, a guide 50 extending outward is provided at the upper and lower ends of the opening, and a nylon brush (not shown) is provided at the leading end of the guide 50. A slope plate 51 is provided toward the inside of the recovery tank 45, consecutively to the guide 50 provided at the lower end of the opening of the case 43.

The perpendicular conveying belt mechanism 46 and guide belt mechanism 47 are driven by a drive motor (not shown), and the impeller 48 is rotated at high speed by a drive motor (not shown).

On the other hand, a turntable 53 is supported to be free to swirl in the vertical direction by way of a support member, and rotation of a drive motor 55 mounted on a fixing table 54 is transmitted to the turntable 53 by way of transmission mechanism by means a turntable drive mechanism 52.

At the plate side of the turntable 53, the nozzle diaphragm 110 which is a turbine part is held as a large part, perpendicularly by way of a fixing piece 56.

Reference numeral 57 is a frame with casters, and a dust cover 58 with fastener is provided in this frame 57 with casters, and thereby the turntable 53 and the nozzle diaphragm 110 fixed thereto are covered, and are free to be moved in and out.

In the large part polishing apparatus having such a configuration, first at a predetermined position of the turntable 53, the nozzle diaphragm 110 having the stationary vanes 105 mounted thereon is fixed by the fixing piece 56.

The frame 57 with casters is moved, and the entire turntable 53 is covered with the dust cover 58.

Further, the carriage 41 with lifter is moved, and the opening at the injection nozzle 49 side of the polishing apparatus main body 42 is brought closer to the turntable 53 side, and, for example, the lower half side of the stationary vanes 105 is brought into contact with the plate side of the turntable 53 at a position ready for polishing. When polishing the outer circumference of the nozzle diaphragm 110, as shown in FIG. 6A, the polishing apparatus main body 42 is lowered by the lifter to the lower position of the nozzle diaphragm 110, and when polishing the inner circumference of the nozzle diaphragm 110, as shown in FIG. 7A, it is raised to the upper position of the nozzle diaphragm 110.

By driving the perpendicular conveying belt mechanism 46, guide belt mechanism 47, and impeller 48, the abrasive particles 44 in the recovery tank 45 are conveyed upward by the perpendicular conveying belt mechanism 46, and further sent into the impeller 48 from the highest position by means of the guide belt mechanism 47.

As a result, by the rotary energy of the impeller 48, the abrasive particles 44 are injected by force into the tangential direction of the impeller 48, and collide against the surface of the nozzle diaphragm 110 at a speed of about 1000 m per minute or more through the injection nozzle 49.

Figure 6A:
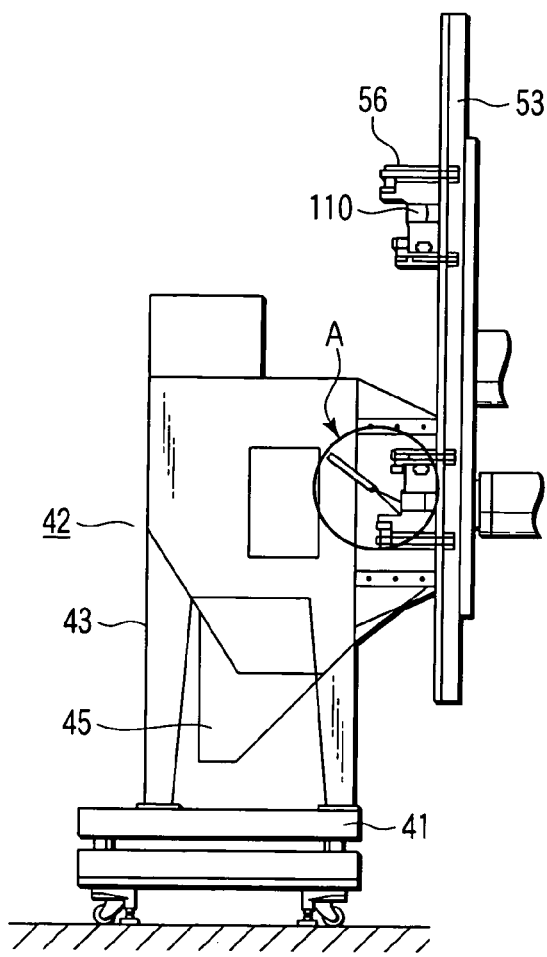
FIG. 6A is a diagram showing a state of polishing a lower half of a nozzle diaphragm outer ring inner circumference and a stationary vane plate by lowering the polishing apparatus main body in the embodiment to the lower position of the stationary vanes.
Figure 7A:
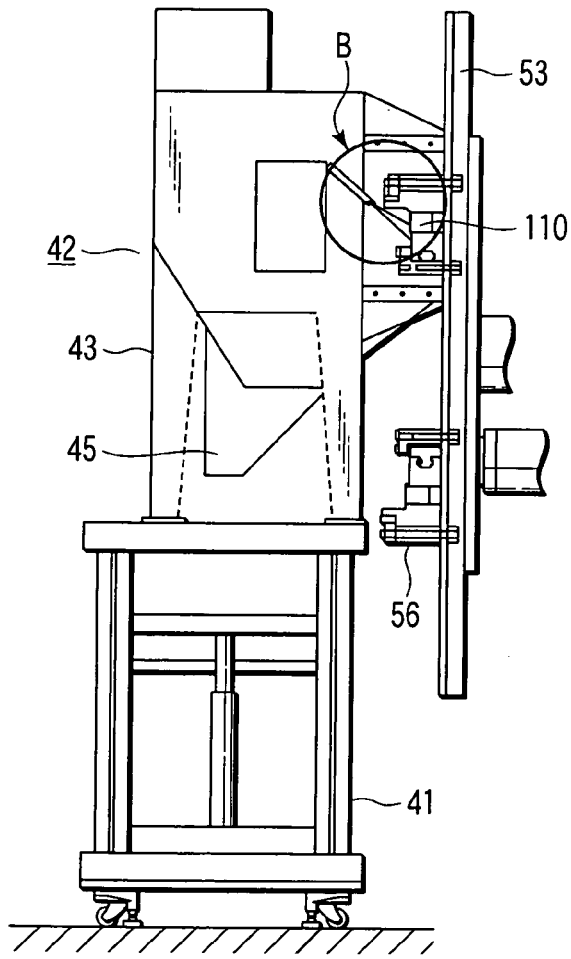
FIG. 7A is a diagram showing a state of polishing an upper half of the nozzle diaphragm inner ring outer circumference and stationary vanes by raising the same polishing apparatus main body to the upper position of the stationary vanes.
Figure 6B:
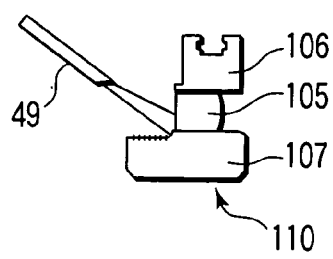
FIG. 6B is an enlarged view of part A in FIG. 6A.
Figure 7B:
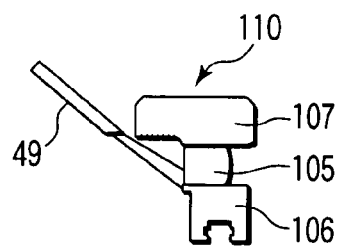
FIG. 7B is an enlarged view of part B in FIG. 7A.

Therefore, as far the polishing apparatus main body 42 is at the lower position of the nozzle diaphragm 110 fixed on the turntable 53 as shown in FIG. 6A, the inner circumference of the diaphragm outer ring 107 of the nozzle diaphragm 110 and the lower half of the stationary vanes can be polished, and the inner circumference of the diaphragm inner ring 106 and the upper half of the stationary vanes can be polished.

The abrasive particles 44 having collided against the surface of the nozzle diaphragm 110 and having finished polishing are collected in the recovery tank 45 by sliding down the slope plate 51 from the lower guide 50.

In this case, by the nylon brush provided at the leading end of the guide 50, there is no gap to the turntable 53, and bouncing or scattering of the abrasive particles 44 can be prevented.

Thus, in the second embodiment, the nozzle diaphragm 110 is held perpendicularly by the fixing piece 56 to the turntable 53 supported to be free to swirl in the perpendicular direction through the support member on the turntable drive mechanism 52, and while the turntable 53 is properly driven to swirl, the abrasive particles 44 conveyed upward by the perpendicular conveying belt mechanism 46 from the recovery tank 45 of the polishing apparatus main body 42 mounted on the carriage 41 with lifter are supplied into the impeller 47 rotating at high speed, are injected to collide against the surface from the injection nozzle 49. Therefore, without significantly changing the shape of the injection nozzle 49 having a large effect on the injection energy, the nozzle diaphragm 110, which is one of the large parts, can be polished efficiently.

The polishing apparatus main body 42 is raised or lowered by the carriage 41 with lifter, and the injection port position and injection angle of the injection nozzle 49 can be properly adjusted to the polishing position of the nozzle diaphragm 110. Therefore, the surface can be polished efficiently and securely including the narrow parts and fitting parts difficult to polish.

After polishing of parts, the abrasive particles are collected in the recovery tank 45 after sliding down on the slope plate 51, and the abrasive particles can be effectively used. Accordingly, it is not only advantageous economically, but the time for recovery and re-feeding of abrasives can be saved.

Figure 8:
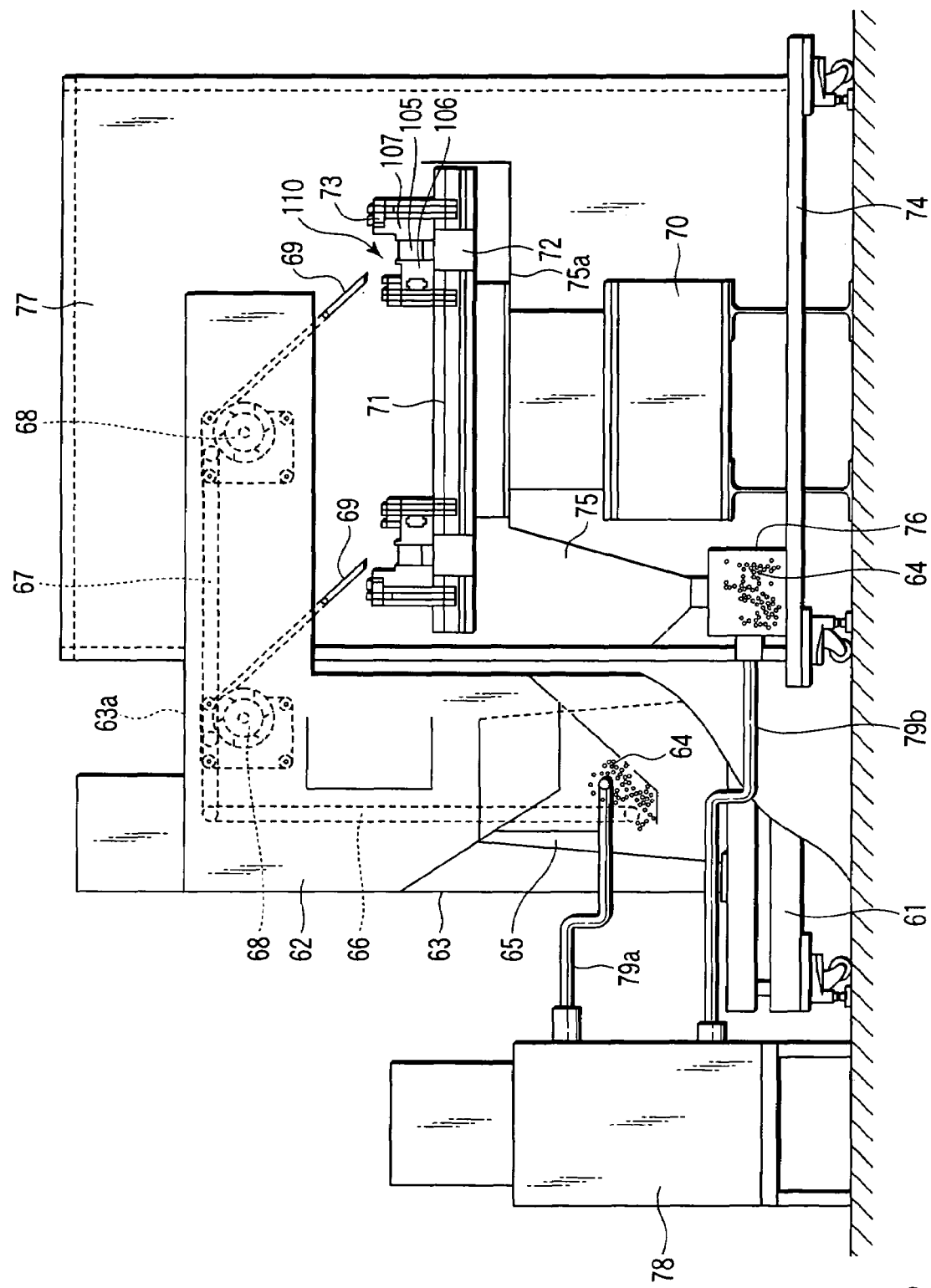
FIG. 8 is a side view showing a third embodiment of a large part polishing apparatus according to the invention.

FIG. 8 is a side view showing a third embodiment of a large part polishing apparatus according to the invention.

In FIG. 8, reference numeral 61 is a carriage with lifter having casters provided in the lower part, and a polishing apparatus main body 62 is mounted on the carriage 61 with lifter.

The polishing apparatus main body 62 comprises an internal tank 65 containing abrasive particles 64 made of elastic material as a core, as an abrasive, in a case 63 having an injection mechanism housing portion 63a extending in the horizontal direction in the upper part, a perpendicular conveying belt mechanism 66 for conveying the abrasive particles 64 in the internal tank 65 to a proper height above the tank 65, a horizontal conveying belt mechanism 67 for conveying the abrasive particles 64 conveyed upward from the internal tank 65 by the perpendicular conveying belt mechanism 66 to the injection mechanism housing portion 63a side, two impellers 68 disposed parallel along the horizontal conveying belt mechanism 67 for imposing rotary energy to the abrasive particles 64 to be supplied from the horizontal direction, and a trough-shaped injection nozzle 69 for injecting the abrasive particles 64 at high speed from the tangential direction of each impeller 68.

The perpendicular conveying belt mechanism 66 and horizontal conveying belt mechanism 67 are driven by drive motors (not shown), and the two impellers 68 are rotated at high speed by drive motors (not shown). Herein, a block formed by the impellers 68, impeller drive motors (not shown), and injection nozzle 69 is called an injection mechanism 69a.

On the other hand, reference numeral 70 is a support stand, and a turntable 71 is horizontally supported on this support stand 70, and is rotated and driven by a drive motor (not shown). The turntable 71 has a plurality of penetration holes 72 in a circumferential direction outside of the center, and the nozzle diaphragm 110 as a turbine part is fixed along these penetration holes 723 by means of a fixing piece 73.

Reference numeral 74 is a frame with casters, and this frame 74 with casters is provided with a recovery hopper 75 having an abrasive particle receiver which covers the lower part of the turntable 71, and a recovery tank 76 is provided at the outlet of the recovery hopper 75.

The frame 74 with casters is provided with a dust cover 77 having a fastener as an opening, thereby covering the turntable 71 and the nozzle diaphragm 110 as the work, and this work is free to be moved in and out.

Further, reference numeral 78 is an abrasive feed and recovery unit installed near the polishing apparatus main body 62. The abrasive feed and recovery unit 78 has a feed hose 79a connected to the internal tank 65 of the polishing apparatus main body 62 to feed the abrasive particles 64 into the internal tank 65, and also has a recovery hose 79b connected to the recovery tank 76 provided in the frame 74 with casters, so that the abrasive particles 64 are collected from the recovery tank 76.

In the large part polishing apparatus having such a configuration, the stationary vanes 105 of the nozzle diaphragm 110 as a large part are fixed along the positions of penetration holes 72 of the turntable 71 by means of the fixing piece 73.

In this state, the carriage 61 with lifter is moved, the injection mechanism housing portion 63a in the case 63 of the polishing apparatus main body 62 is inserted into the frame 74 with casters covered with the dust cover 77, and the two impellers 68 and injection nozzle 69 are brought closer to the turntable 71 side. Accordingly, the opening of the injection nozzle 69 at the leading end side in the horizontal conveying belt mechanism 67 is adjusted to the outside of the outside of the stationary vanes 105 (the inner side of the nozzle diaphragm outer ring 107), and the opening of the injection nozzle 69 before it is adjusted toward the inside of the stationary vanes 105 (the outer side of the nozzle diaphragm inner ring 106).

To polish the nozzle diaphragm outer ring 107, nozzle diaphragm inner ring 106, and stationary vanes 105, when the perpendicular conveying belt mechanism 66, horizontal conveying belt mechanism 67, and two impellers 68 are driven, the abrasive particles 64 in the internal tank 65 are conveyed upward by the perpendicular conveying belt mechanism 66, and further changed in direction from the highest position to the horizontal conveying belt mechanism 67, and sent into the two impellers 68.

As a result, by the rotary energy of the impellers 68, the abrasive particles 64 pop out by force in the tangential direction of the impellers 68, and collide against the inner side of the nozzle diaphragm outer ring 107, the outer side of the nozzle diaphragm inner ring 106, and the surface of stationary vanes 105 by means of the injection nozzle 69 at a speed of about 1000 m per minute or more.

Therefore, in the nozzle diaphragm 110 fixed horizontally, by the two impellers 68 and injection nozzle 69, the outer side of the nozzle diaphragm inner ring, an inner-side side wall of the nozzle diaphragm outer ring, and the stationary vanes can be polished at the same time.

The abrasive particles 64 having collided against and polished the surface of the nozzle diaphragm 110 fall into the recovery hopper 75 through the penetration holes 762 provided in the turntable 71, and are collected in the recovery tank 76 by way of the outlet.

The abrasive particles 64 collected in the recovery tank 76 are collected into the abrasive feed and recovery unit 78 by way of the recovery hose 79b, and are supplied into the internal tank 65 of the polishing apparatus main body 62 through the feed hose 79a, and then the same polishing operation is repeated cyclically.

The turntable 71 rotates sequentially according to the polishing state of the work. That is, after finishing polishing of one stationary vane 105 of the nozzle diaphragm 110, or the outer circumference of the nozzle diaphragm inner ring 106 and the inner circumference of the nozzle diaphragm outer ring 107 near the stationary vane, by rotating by the same angle as the mounting pitch of the stationary vane 105 in the nozzle diaphragm 110, the next stationary vane 105 is rotated to come to the polishing position of the injection nozzle 69.

Thus, in the third embodiment, in the nozzle diaphragm 110 fixed on the turntable 71 maintained in the horizontal state, the outer side of the nozzle diaphragm inner ring 106, the inner side of the nozzle diaphragm outer ring 107, and the stationary vane 105 are polished simultaneously by the two impellers 68 and injection nozzle 69. Therefore, if the injection nozzle 69 is fixed in the tangential direction of the impellers 68, the nozzle diaphragm or the large turbine part can be polished efficiently.

After polishing, the abrasive particles are collected in the recovery hopper 75 through the penetration holes 72 provided in the turntable 71, and put into the recovery tank 76, and are further collected in the abrasive feed and recovery unit 78, and supplied again into the internal tank 65 of the polishing apparatus main body 62, and the abrasives can be effectively used. Therefore, it is not only advantageous economically, but the time for recovery and re-feeding of abrasives can be saved.

Besides, since the table for mounting the object of polishing is the turntable 71, all stationary vanes 105 can be polished without moving the injection nozzle 69 in the angle direction of the nozzle diaphragm 110. Hence, the impeller 68 complicated in the conveying structure of the abrasive particles 64 is not required to be formed in a structure movable in the peripheral direction, and it is possible to form in a relatively simple structure.

The injection nozzle 69 is designed to be movable in the radial direction (lateral direction in FIG. 8) in consideration of the nozzle diaphragm 110 of different shape being mounted on the turntable 71.

On the other hand, by entering the polishing complete time of one position and mounting pitch of stationary vanes in a control device (not shown), the turntable 71 can be controlled to rotate by a predetermined angle automatically after a specified time, so that one nozzle diaphragm 110 can be polished fully automatically.

The dust cover 77 is intended to prevent the abrasive particles 64 or abrasive adhered to the abrasive particles 64 and metal dust polished out of the object of polishing from scattering about. However, it is not particularly specified in material or structure, including the vinyl sheet, canvas, or screen or other plate, as far as an opening can be formed therein for conveying the injection mechanism housing portion 63a into the cover.

Figure 9:
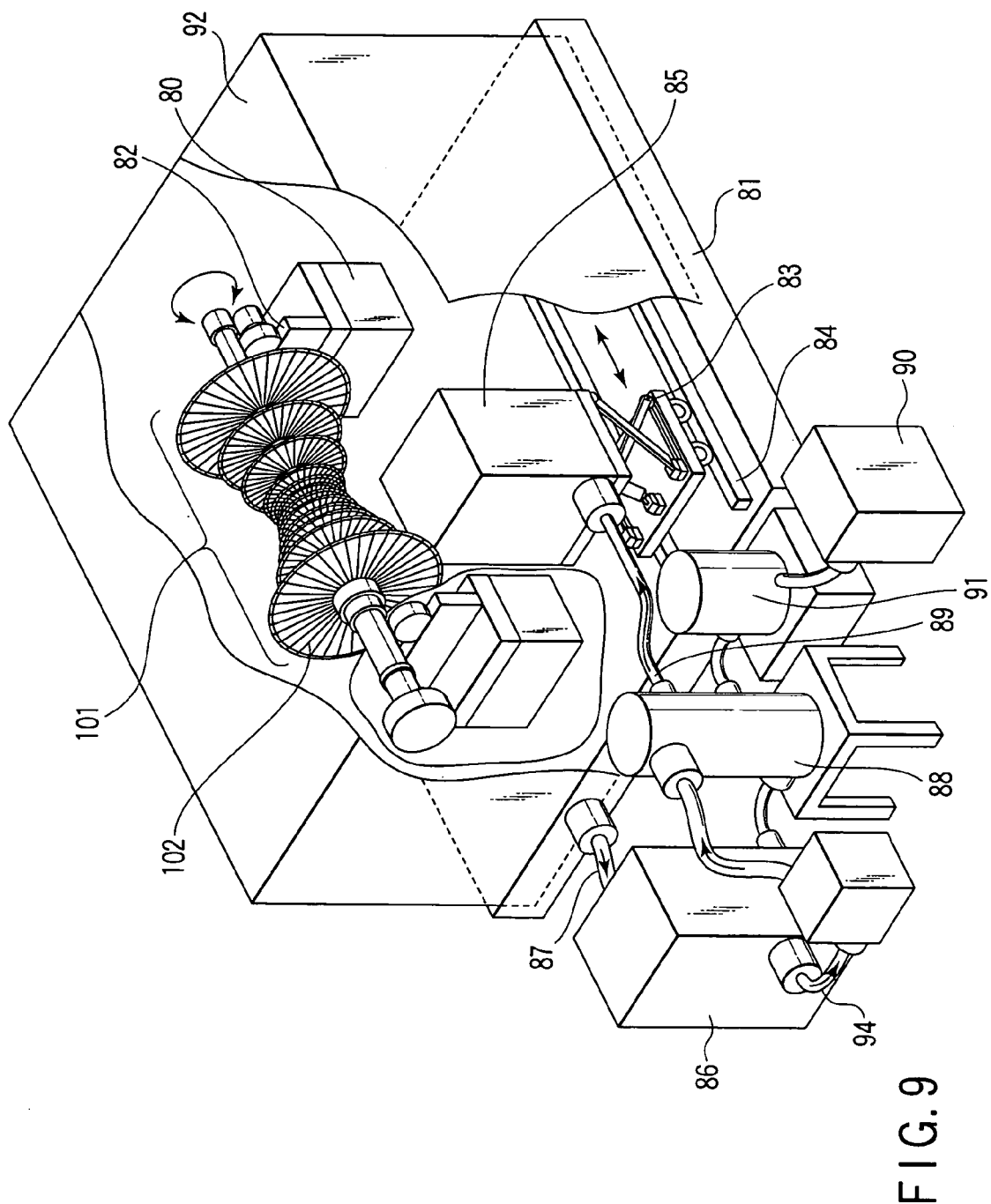
FIG. 9 is a bird's-eye view showing a fourth embodiment of a large part polishing apparatus according to the invention.

FIG. 9 is a bird's-eye view showing a fourth embodiment of a large part polishing apparatus according to the invention.

In FIG. 9, reference numeral 80 is a stand mounted at a proper distance on a base 81 serving also as a recovery hopper, and a turbine rotor 101 which is a large rotary part is supported by a roller support rotary mechanism 82 provided on the stand 80.

Reference numeral 83 is a lifter mechanism with wheels capable of moving in the axial direction along rails 84 being laid on the base 81 at one side of the turbine rotor 101, and a polishing apparatus main body 85 is mounted on the lifter mechanism 83 with wheels.

This polishing apparatus main body 85 comprises an impeller (not shown) for giving rotary energy to abrasive particles, and a trough-shaped injection nozzle for injecting abrasive particles projected from the tangential direction of the impeller toward a moving vane 102 of the turbine rotor 101 at the polishing position while moving in the radial direction of the turbine rotor by an injection nozzle mechanism (not shown).

Reference numeral 86 is an abrasive feed and recovery unit connected to the base 81 serving also as the recovery hopper through a recovery tube 87 for collecting the abrasive particles falling into the recovery hopper after polishing the moving vane 102, and after removing foreign matter from the collected abrasive particles, the abrasive feed and recovery unit 86 supplied the abrasive particles into the polishing apparatus main body 85 through a flexible tube 89 connected by way of a dust collector 88.

The dust collector 88 is designed to sort out and collect the foreign matter collected together with the abrasive particles in the abrasive feed and recovery unit 86.

Reference numeral 90 is an air compressor, and an air receiver tank 91 is connected to the air compressor 90, and it supplies driving force to the dust collector 88 and abrasive feed and recovery unit 86, and after the polishing process of the moving vanes, the compressed air is blown to the turbine rotor 101 and moving vane 102, and the sticking abrasive particles and abrasive sticking to these abrasives and metal dust formed by polishing are scattered about.

Reference numeral 92 is a dust cover covering the turbine rotor 101 and the entire outer circumference of the polishing apparatus main body 85.

In the large part polishing apparatus having such a configuration, when polishing the moving vanes, the injection nozzle (not shown) of the polishing apparatus main body 85 is positioned to the moving vane 102 as the polishing position of the turbine rotor 101 as one of the large rotary parts mounted horizontally on the roller support rotary mechanism 82, by means of the lifter mechanism 83 with wheels and injection nozzle slide mechanism (not shown), and the abrasives are injected from the injection nozzle of the polishing apparatus main body 85 at a speed of 1000 m per minute or more to the polishing surface of the moving vane 102, thereby colliding and polishing.

By rotating the turbine rotor 101 slowly during polishing, one entire turbine stage (whole circumference) can be polished uniformly.

After finishing the moving vanes 102 in one turbine stage, by moving on the rails 84 by the lifter mechanism 83 with wheels, the injection nozzle of the polishing apparatus main body 85 is positioned to the polishing position of the moving vanes 102 of the next turbine stage, and the polishing surface of the moving vanes 102 is polished similarly.

Thus, according to the fourth embodiment, without having to picking up one moving vane 102 each from the turbine rotor 101, the rotor is rotated sequentially in a state planted in the turbine rotor 101, and the injection nozzle position of the polishing apparatus main body 83 is moved in the radial direction of the turbine rotor, and it is designed to polish while moving also in the turbine axial direction.

Therefore, the moving vanes can be polished without removing them from the existing turbine rotor, so that the term of work in maintenance and inspection can be shortened.

After polishing, the abrasive particles are collected in the hopper, put into the abrasive feed and recovery unit 86, and supplied again into the polishing apparatus main body 85. Therefore, the abrasive particles can be effectively used, and it is not only advantageous economically, but the time for recovery and re-feeding of abrasives can be saved.

Further, by a structure capable of changing the position of the injection nozzle freely, it is easy to access to a desired position when polishing an existing turbine rotor, and preparation for polishing work may be done more efficiently.

In the embodiment, the polishing apparatus main body 85 is disposed at one side of the turbine rotor 101 which is a large rotary part, but at both sides of the turbine rotor 101, the polishing apparatus main body 85 mounted on the mobile carriage of caster structure may be disposed, and without traversing the position of the injection nozzle, the polishing apparatus main body 84 may be positioned to a predetermined moving vane position on the carriage, and each injection area may be polished at the same time.

In such a configuration, in addition to the same effects, more efficient polishing may be realized by a simple structure and preparation.

Figure 10:
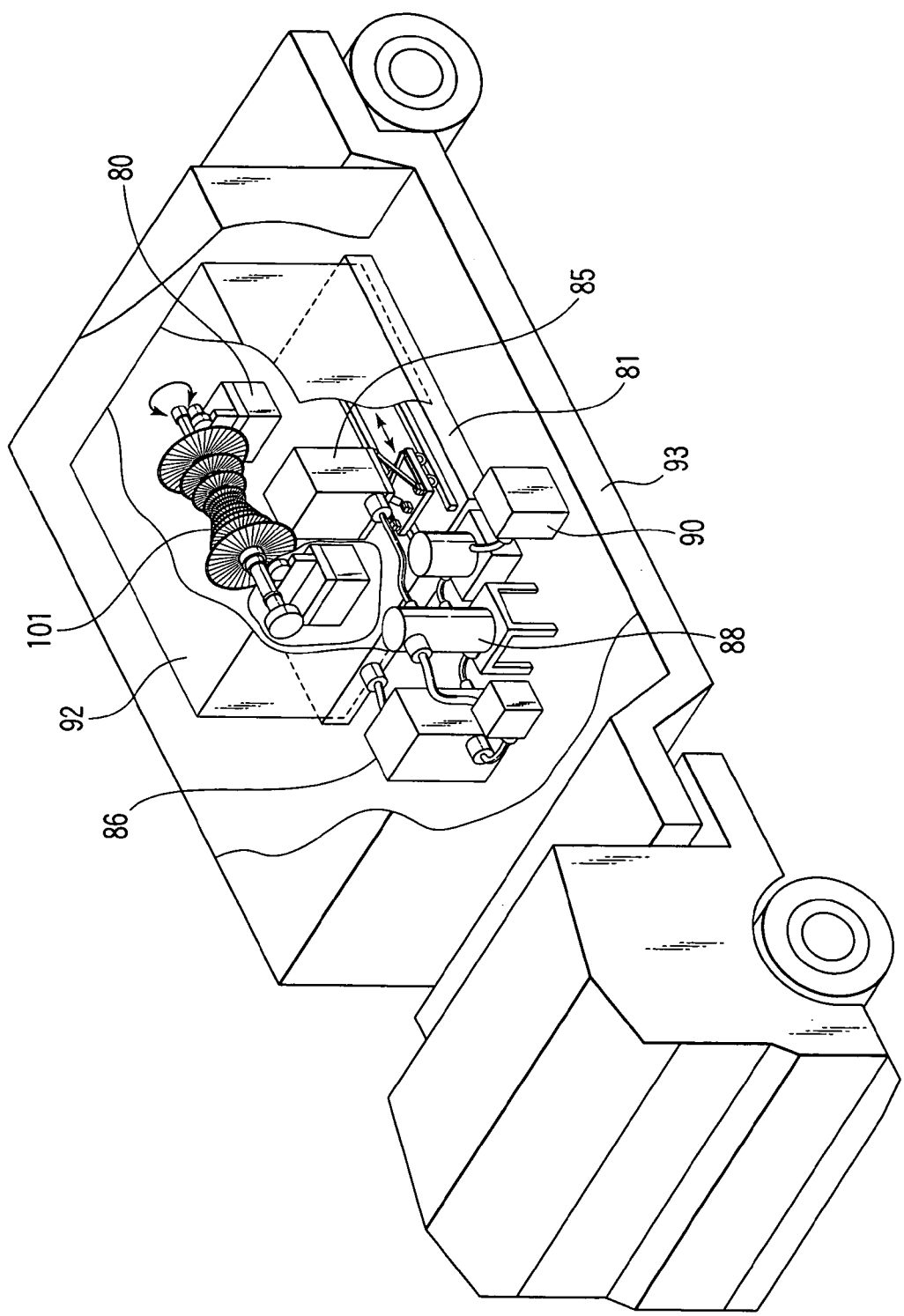
FIG. 10 is a bird's-eye view showing a modified example of the embodiment.
Figure 11:
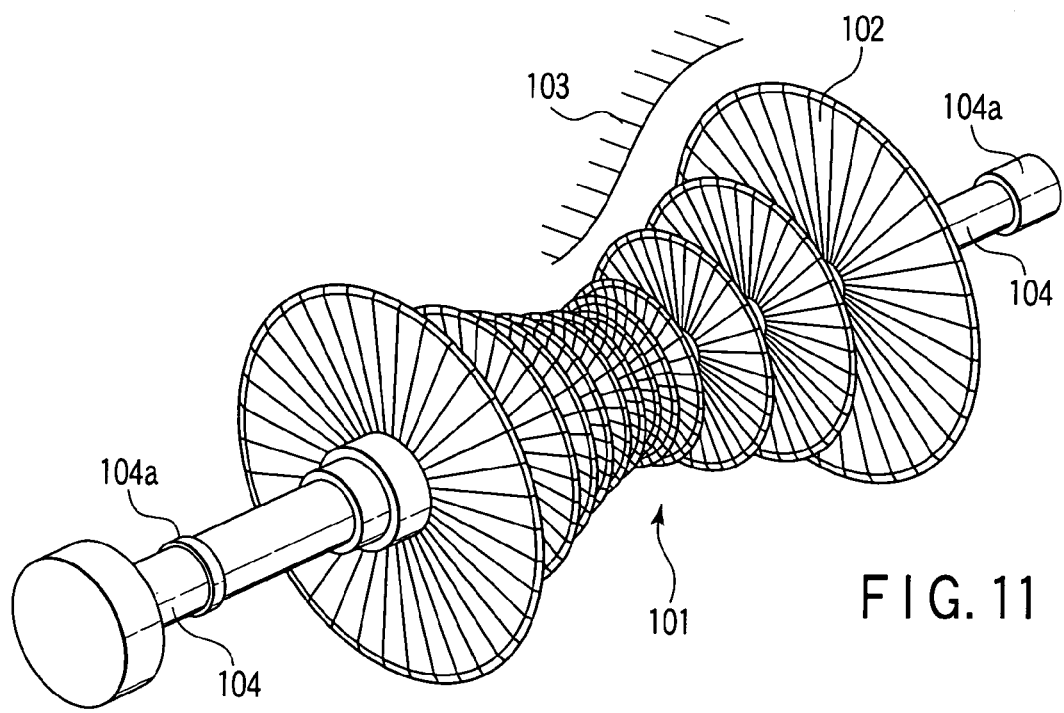
FIG. 11 is a bird's-eye view schematically showing an entire turbine rotor.
Figure 12:
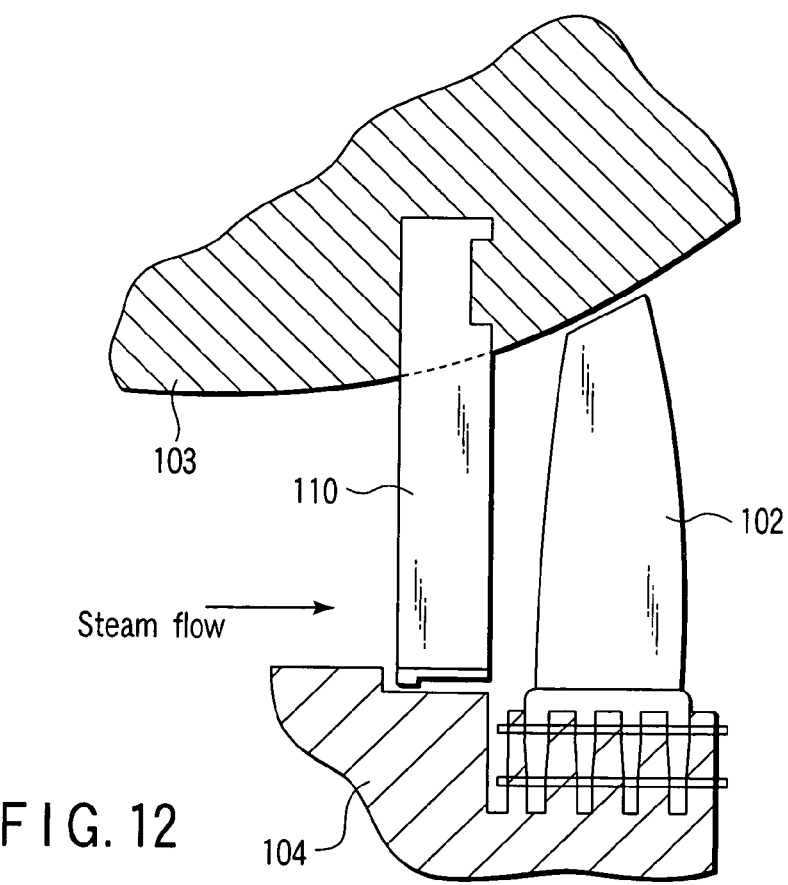
FIG. 12 is a detailed view of a unit of one turbine stage in FIG. 11.
Figure 13A:
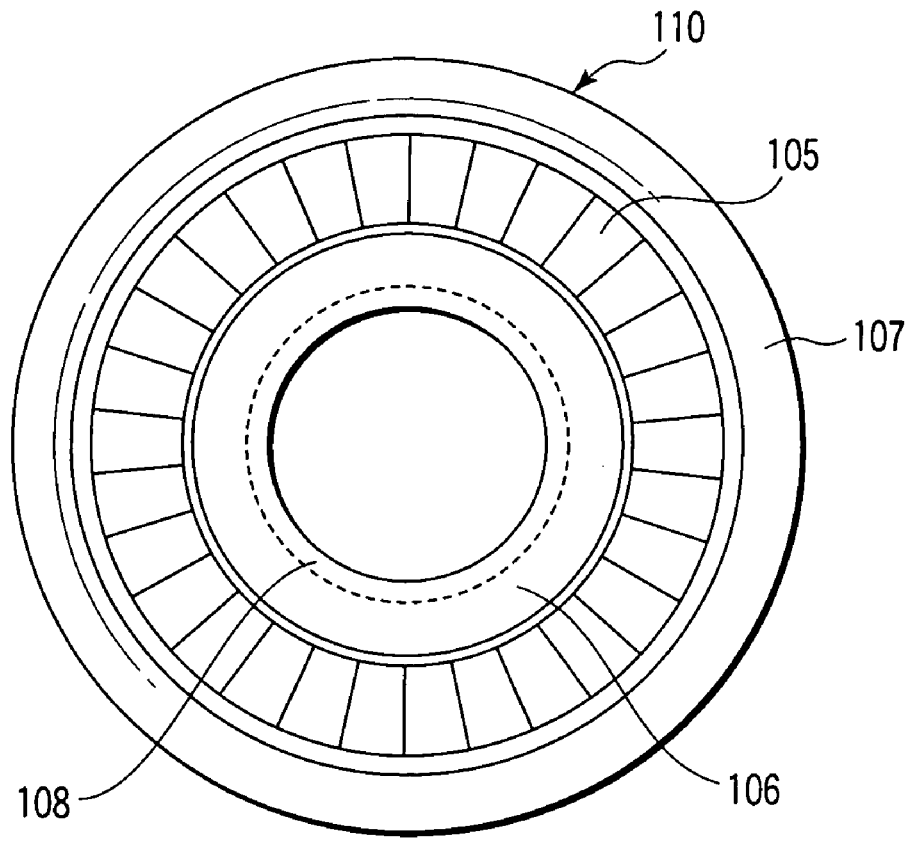
FIG. 13A is a plan view showing a stationary vane.
Figure 13B:
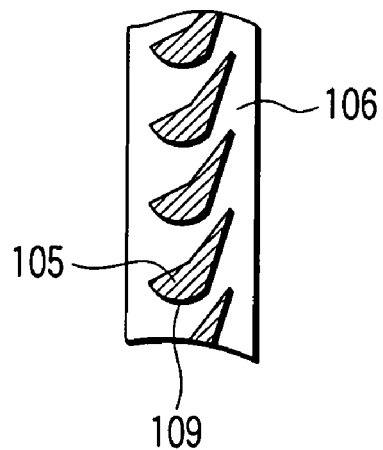
FIG. 13B is a view from a peripheral unit of the stationary vane in FIG. 13A.

In the embodiment, the entire large part polishing apparatus is designed to be installed in a factory or the like, but by mounting the polishing apparatus and the peripheral equipment on a trailer 93 as shown in FIG. 10, the turbine rotor 101 can be polished in field work.

In this configuration, the preparation time can be minimized, and the space of the field repair area can be minimized, and more efficient polishing work is possible, and the repair and inspection period of existing turbine rotor can be shortened. Therefore, it is particularly effective for small and medium turbine rotors.

In the foregoing embodiments, one kind of abrasive particles is used, but two or more kinds of abrasive particles may be used, and the abrasive particles may be changed over and injected depending on the polishing parts, and the grain size or material of abrasive particles may be changed depending on the size of flaw or degree of deterioration of the surface state, or presence or absence of oxide scales.

In this manner, the abrasives may be changed over in a short time depending on the surface state, and an extremely efficient polishing work may be realized.

The first to fourth embodiments use an impeller is used to apply rotary energy to the abrasive particles, and a polishing head having an injection nozzle that injects the abrasive particles to the surface to be polished, in a direction tangential to the impeller. Nonetheless, a plurality of rollers may be arranged around the outer circumferential surface of the impeller, and an endless belt may be wrapped around the impeller, not covering a particle-injecting opening, and may move over the rollers as the impeller rotates. In this case, a polishing head may be used, which injects abrasive particles directly to the surface to be polished, through the particle-injecting opening in a direction tangential to the impeller.

In the first to fourth embodiments, the nozzle diaphragms and turbine rotors are shown as objects of polishing, but not limited to these turbine parts. The polishing apparatus may be applied in parts of any shape that can be mounted on the turntables and rotary mechanisms explained in the embodiments, and the applicable parts are not particularly limited.

The invention is capable of polishing the surface of a large part hitherto difficult to polish, including a narrow or fitting part of the large part such as a turbine nozzle, and large rotary part such as a moving vane, capable of automating polishing works for a long time and in poor environments, and also capable of removing the oxide films without lowering the surface roughness, thereby enhancing the quality of nondestructive inspection and polishing work efficiency.

What is claimed is:

1. A large part polishing apparatus for projecting an abrasive particle having an elastic material as a core at a predetermined speed as an abrasive, and polishing by colliding the abrasive particle against a surface to be polished of a large part, the apparatus comprising:
   a recovery tank table on which the large part is adapted to be mounted and which recovers the abrasive particle;
   a turntable on which the recovery tank table is mounted and rotatably supported while holding the recovery tank table and the large part at a predetermined position and driven by a driving motor;
   an abrasive feeding unit which feeds the abrasive particle to a predetermined position;
   a polishing apparatus main body which comprises a polishing head including at least an impeller which is driven by an impeller driving motor and applies rotary energy to the abrasive particle to be supplied from the abrasive feeding unit, the polishing head injecting the abrasive particle from the tangential direction of the impeller toward a surface to be polished of the large part held on the recovery tank table; and
   an abrasive recovery unit which recovers the abrasive particle injected to the surface to be polished of the large part by the polishing apparatus main body, said abrasive recovery unit comprising the recovery tank table and a conveyer arranged to convey recovered abrasive particle to a predetermined height, and a flexible tube coupled to the conveyer and arranged to feed the recovered abrasive particle into the abrasive feeding unit;
   wherein the turntable is supported in a horizontal state, and rotated and driven by the driving motor, and the polishing apparatus main body comprises the polishing head which is disposed to a manipulator or a moving unit capable of moving in the horizontal direction and vertical direction so as to swirl in the horizontal direction and swivel.

2. A large part polishing apparatus for projecting an abrasive particle having an elastic material as a core at a predetermined speed as an abrasive, and polishing by colliding the abrasive particle against a surface to be polished of a large part, the apparatus comprising:
   a recovery tank table on which the large part is adapted to be mounted and which recovers the abrasive particle;
   a turntable on which the recovery tank table is mounted and rotatably supported while holding the recovery tank table and the large part at a predetermined position and driven by a driving motor;
   an abrasive feeding unit which feeds the abrasive particle to a predetermined position;
   a polishing apparatus main body which comprises a polishing head including at least an impeller which is driven by an impeller driving motor and applies rotary energy to the abrasive particle to be supplied from the abrasive feeding unit, the polishing head injecting the abrasive particle from the tangential direction of the impeller toward a surface to be polished of the large part held on the recovery tank table; and
   an abrasive recovery unit which recovers the abrasive particle injected to the surface to be polished of the large part by the polishing apparatus main body, said abrasive recovery unit comprising the recovery tank table and a conveyer arranged to convey recovered abrasive particle to a predetermined height, and a flexible tube coupled to the conveyer and arranged to feed the recovered abrasive particle into the abrasive feeding unit;
   wherein the turntable is supported in a horizontal state, and rotated and driven by the driving motor, and the polishing apparatus main body comprises plural polishing heads disposed at different position, and an injection mechanism housing unit which guides the polishing heads to the top of the turntable.

* * * * *